United States Patent
Ebashi

(10) Patent No.: US 6,564,133 B2
(45) Date of Patent: May 13, 2003

(54) SELF-DIAGNOSIS SYSTEM IN AN AUTOMATIC TRANSMISSION

(75) Inventor: Akio Ebashi, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 09/917,679

(22) Filed: Jul. 31, 2001

(65) Prior Publication Data

US 2002/0026271 A1 Feb. 28, 2002

(30) Foreign Application Priority Data

Aug. 7, 2000 (JP) ........................ 2000-238044

(51) Int. Cl.$^7$ ................ F16H 59/00; F16H 61/16; F02D 45/00
(52) U.S. Cl. ............ 701/62; 701/63; 477/125; 74/336 R
(58) Field of Search ............... 701/62, 63, 53; 477/125, 906, 121, 115, 61, 62, 907; 74/473.12, 336 R

(56) References Cited

U.S. PATENT DOCUMENTS

| | | | | |
|---|---|---|---|---|
| 4,635,508 A | * | 1/1987 | Tatsumi ................ | 74/866 |
| 4,667,541 A | * | 5/1987 | Shimaoka et al. ........ | 74/866 |
| 4,779,490 A | * | 10/1988 | Milunas et al. ......... | 74/862 |
| 4,892,014 A | * | 1/1990 | Morell et al. .......... | 74/866 |
| 6,030,316 A | * | 2/2000 | Kadota ................. | 477/121 |
| 6,073,507 A | * | 6/2000 | Ota et al. ............. | 74/335 |
| 6,230,576 B1 | * | 5/2001 | Yamada et al. .......... | 74/335 |
| 6,309,324 B1 | * | 10/2001 | Sawa et al. ............ | 477/125 |

FOREIGN PATENT DOCUMENTS

JP  11-108706  4/1999

* cited by examiner

*Primary Examiner*—Tan Q. Nguyen
*Assistant Examiner*—Dalena Tran
(74) *Attorney, Agent, or Firm*—Rader, Fishman & Grauer PLLC; Ronald F. Kananen, Esq.

(57) ABSTRACT

An automatic transmission comprising a controlling unit 5 for driving and controlling an actuator 3 until a rotation position, which is detected by a potentiometer 13 in response to the receipt of an instruction signal from an operation switch portion 17, accords with the instructed shifting position. The transmission includes a self-diagnosis unit 9 for diagnosing a trouble after driving the actuator 3 to the position over the instructed shifting position for a predetermined amount on the basis of the first instruction signal by the operation switch portion 17 at a starting time of driving an automobile and after driving the actuator 3 in reverse to the instructed shifting position, as well as driving the actuator 3 by varying high or low the duty ratio in driving and controlling the actuator 3, in accordance with the judgment whether or not an output signal of the potentiometer 13 corresponds to such driving.

9 Claims, 7 Drawing Sheets

Fig.6

| Controlling for self-diagnosis | In the case that a trouble in controlling in the direction from P to D is detected | In the case that a trouble in controlling in the direction from D to P is detected | In the case that there is a trouble in controlling in the both directions |
|---|---|---|---|
| P → R | Only the shift to P is accepted. | Only the shift to N is accepted. | Current condition is maintained. Sift input is ignored. |
| P → N | ← | Control is stopped at N. Shift input is ignored. | ← |
| P → D4-D1 | ← | ← | ← |

SELF-DIAGNOSIS SYSTEM IN AN AUTOMATIC TRANSMISSION

BACKGROUND OF THE INVENTION

1. Field of the Invention

The present invention relates to a self-diagnosis system in an automatic transmission for diagnosing whether or not an electric actuator for switching a shifting position of the automatic transmission is normally driven and controlled.

2. Description of the Related Art

A conventional automatic transmission includes an electric actuator which is driven and controlled by means of a circuit shown in FIG. 8 and described in a bullet of the Japanese Laid-Open Patent Application No. Hei-11-108706, for example.

In the conventional automatic transmission a motor driving circuit 101 shown in FIG. 8 connects in series four switching elements Q1 to Q4 comprising, for example, a power MOSFET between power supply terminals VB and GND to form an H-type of bridge circuit, and is formed by connecting a DC motor M, which is to be driven, between output terminals M+ and M− thereof. A row of a PWM pulse is supplied to either the element Q2 or the element Q4 in a normal-reverse electric current path passing through the switching elements Q1 and Q4 or the switching elements Q2 and Q3, while an ON signal or an OFF signal is supplied to the other element Q3 or Q1, so that rotation direction control and speed control would be enabled.

Conventionally, a circuit for self-diagnosing has been mounted in a controlling unit in general in advance, and a pseudo-signal has been generated in the above circuit in such timing that energizing the unit is started so that an operation check would be performed, in order to diagnose whether the rotation direction and the speed of such motor driving and controlling circuit 101 of an automatic transmission are normally controlled or not.

It is required, however, to mount a large number of circuits in order to check all necessary circuits in the structure described above, which leads to an increase in cost. Further, the precision of the self-diagnosis is limited because the pseudo-signal is inputted.

SUMMARY OF THE INVENTION

An object of the invention is to provide a self-diagnosis system in an automatic transmission capable of certain self-diagnosis in a simple structure.

An invention according to a first aspect is an automatic transmission comprising: an electric actuator for switching a shifting position by rotating a manual shaft; a shift operating unit for outputting an instruction signal for instructing the above-mentioned shifting position; a rotation position detecting unit for detecting a rotation angle of the above-mentioned manual shaft on the basis of an output signal corresponding to the said rotation angle; and a controlling means for driving and controlling the above-mentioned actuator until a rotation position, which is detected by the above-mentioned rotation position detecting unit in response to the receipt of the instruction signal from the above-mentioned shift operating unit, accords with the instructed shifting position, characterized by comprising: self-diagnosis unit for diagnosing a trouble after driving the above-mentioned actuator to the position over the above-mentioned instructed shifting position for a predetermined amount on the basis of the first instruction signal by the above-mentioned shift operating unit at a starting time of driving an automobile and after driving the above-mentioned actuator in reverse to the above-mentioned instructed shifting position, in accordance with the judgment whether or not an output signal of the above-mentioned rotation position detecting unit corresponds to driving mentioned above.

An invention according to the second aspect is an automatic transmission comprising: an electric actuator for switching a shifting position by rotating a manual shaft; shift operating unit for outputting an instruction signal for instructing the above-mentioned shifting position; rotation position detecting unit for detecting a rotation angle of the above-mentioned manual shaft on the basis of an output signal corresponding to the said rotation angle; and controlling unit for driving and controlling the above-mentioned actuator until a rotation position, which is detected by the above-mentioned rotation position detecting unit in response to the receipt of the instruction signal from the above-mentioned shift operating unit, accords with the instructed shifting position, characterized by comprising: self-diagnosis unit for diagnosing a trouble after driving the above-mentioned actuator to the above-mentioned instructed shifting position on the basis of the first instruction signal by the above-mentioned shift operating unit at a starting time of driving an automobile by varying high or low the duty ratio in driving and controlling the above-mentioned actuator, in accordance with the judgment whether or not an output signal of the above-mentioned rotation position detecting unit corresponds to driving mentioned above.

An invention according to the third aspect is an automatic transmission comprising: an electric actuator for switching a shifting position by rotating a manual shaft; shift operating unit for outputting an instruction signal for instructing the above-mentioned shifting position; rotation position detecting unit for detecting a rotation angle of the above-mentioned manual shaft on the basis of an output signal corresponding to the said rotation angle; and controlling unit for driving and controlling the above-mentioned actuator until a rotation position, which is detected by the above-mentioned rotation position detecting unit in response to the receipt of the instruction signal from the above-mentioned shift operating unit, accords with the instructed shifting position, characterized by comprising: self-diagnosis unit for diagnosing a trouble after driving the above-mentioned actuator to the position over the above-mentioned instructed shifting position for a predetermined amount on the basis of the first instruction signal by the above-mentioned shift operating unit at a starting time of driving an automobile and after driving the above-mentioned actuator in reverse to the above-mentioned instructed shifting position, as well as driving the above-mentioned actuator by varying high or low the duty ratio in driving and controlling the above-mentioned actuator, in accordance with the judgment whether or not an output signal of the above-mentioned rotation position detecting unit corresponds to driving mentioned above.

An invention according to the fourth aspect is the self-diagnosis system in an automatic transmission according to one of the first to third aspect, characterized by carrying out the above-mentioned self-diagnosis between a parking range and a neutral range when the first instruction signal by the above-mentioned shift operating unit is a shifting instruction from the parking range to the driving range as well as driving the above-mentioned actuator to the above-mentioned instructed driving range in accordance with a diagnosis that there is no trouble.

An invention according to the fifth aspect is the self-diagnosis system in an automatic transmission according to one of the first to the fourth aspect, characterized in that the above-mentioned controlling unit controls the above-mentioned actuator so that only the shift to a shifting position on the safety side would be possible regardless of the above-mentioned instructed shifting position, when the above-mentioned self-diagnosis unit judges that there is a trouble.

In the invention according to the first aspect, when the shift operating unit instructs a shifting position, the instructed signal is inputted to the controlling unit, which drives and controls the actuator so that the manual shaft would be driven to rotate to the instructed shifting position. When the rotation position of the manual shaft, which is detected by the rotation position detecting unit, accords with the shifting position instructed by the above-mentioned shift operating unit at that time, driving and controlling of the actuator are stopped and the manual shaft stays at the instructed shifting position.

In such automatic transmission, a self-diagnosis unit can self-diagnose a trouble after driving the above-mentioned actuator to the position over the above-mentioned instructed shifting position for a predetermined amount on the basis of the first instruction signal by the above-mentioned shift operating unit at a starting time of driving an automobile and after driving the above-mentioned actuator in reverse to the above-mentioned instructed shifting position, in accordance with the judgment whether or not an output signal of the above-mentioned rotation position detecting unit corresponds to driving mentioned above.

Therefore, there is no need to provide a special circuit for diagnosis, which means a simple circuit structure capable of reduction of a cost, while the self-diagnosis in driving and controlling the actuator depends on no pseudo-signal, so that an accurate self-diagnosis can be achieved.

In the invention according to the second aspect, when the shift operating unit instructs a shifting position, the instructed signal is inputted to the controlling unit, which drives and controls the actuator so that the manual shaft would be driven to rotate to the instructed shifting position. When the rotation position of the manual shaft, which is detected by the rotation position detecting unit, accords with the shifting position instructed by the above-mentioned shift operating unit at that time, driving and controlling of the actuator are stopped and the manual shaft stays at the instructed shifting position.

In such automatic transmission, a trouble can be self-diagnosed after driving the above-mentioned actuator to the above-mentioned instructed shifting position on the basis of the first instruction signal by the above-mentioned shift operating unit at a starting time of driving an automobile by varying high or low the duty ratio in driving and controlling the above-mentioned actuator, in accordance with the judgment whether or not an output signal of the above-mentioned rotation position detecting unit corresponds to driving mentioned above.

Therefore, the circuit structure can be simplified and the cost can be reduced, while the self-diagnosis in driving and controlling the actuator does not depend on pseudo-signal, so that an accurate self-diagnosis can be achieved.

In the invention according to the third aspect, when the shift operating unit instructs a shifting position, the instructed signal is inputted to the controlling unit, which drives and controls the actuator so that the manual shaft would be driven to rotate to the instructed shifting position. When the rotation position of the manual shaft, which is detected by the rotation position detecting unit, accords with the shifting position instructed by the above-mentioned shift operating unit at that time, driving and controlling of the actuator are stopped and the manual shaft stays at the instructed shifting position.

In such automatic transmission, a self-diagnosis unit can self-diagnose a trouble after driving the above-mentioned actuator to the position over the above-mentioned instructed shifting position for a predetermined amount on the basis of the first instruction signal by the above-mentioned shift operating unit at a starting time of driving an automobile and after driving the above-mentioned actuator in reverse to the above-mentioned instructed shifting position, as well as driving the above-mentioned actuator by varying high or low the duty ratio in driving and controlling the above-mentioned actuator in accordance with the judgment whether or not an output signal of the above-mentioned rotation position detecting unit corresponds to driving mentioned above.

Therefore, the circuit structure can be simplified and the cost can be reduced, while the self-diagnosis in driving and controlling the actuator does not depend on pseudo-signal, so that an accurate self-diagnosis can be achieved.

In the invention according to the fourth, in addition to the effect of the invention according to one of the first aspect to third aspect, the self-diagnosis of a trouble can be carried out between a parking range and a neutral range even when the instruction signal is a shifting instruction from the parking range to a driving range, so that a pattern of the diagnosis would be same as the case that the first instruction signal by the shift operating unit is the neutral range, which enables the control to be simplified.

In the invention according to the fifth aspect, in addition to the effect of the invention according to one of the first aspect to the fourth aspect, the controlling unit controls the actuator so that a shifting position would be on the safety side regardless of the instructed shifting position, when the self-diagnosis unit judges that there is a trouble.

Therefore, when it is judged in the self-diagnosis that there is a trouble, it is possible to set the shifting position on the safety side, that is, to fix the shifting position to the neutral position, for example, so that the safety can be ensured.

BRIEF DESCRIPTION OF THE DRAWINGS

FIG. 6 is a table showing shift control to the safety side according to an embodiment;

DESCRIPTION OF THE PREFFERED EMBODIMENTS

Figure 1:
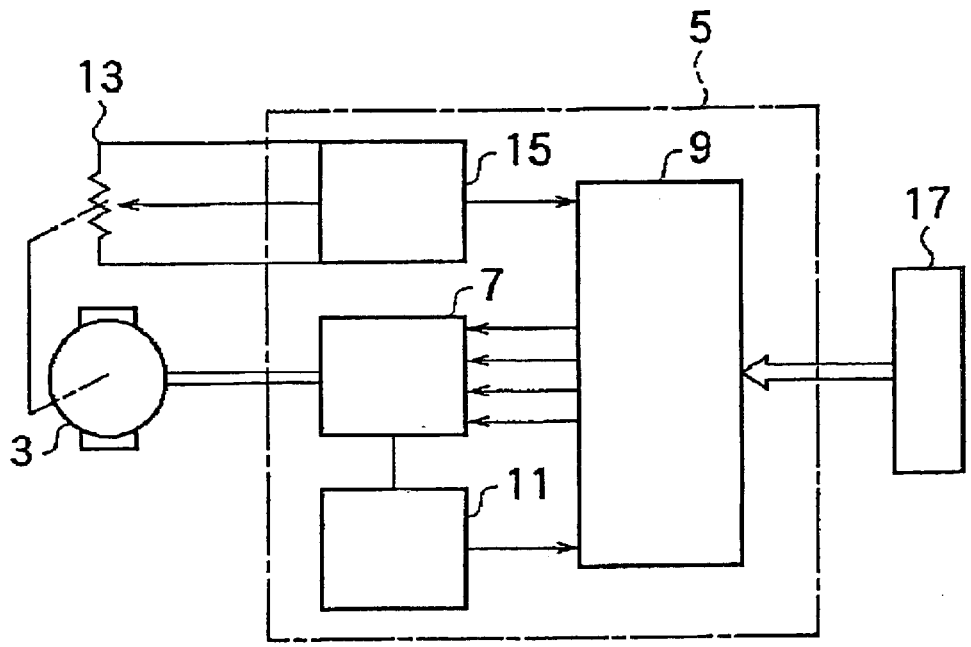
FIG. 1 is a block diagram of a system according to an embodiment of the invention.

FIG. 1 is a block diagram of a self-diagnosis system in an automatic transmission to which an embodiment of the invention is applied.

Figure 8:
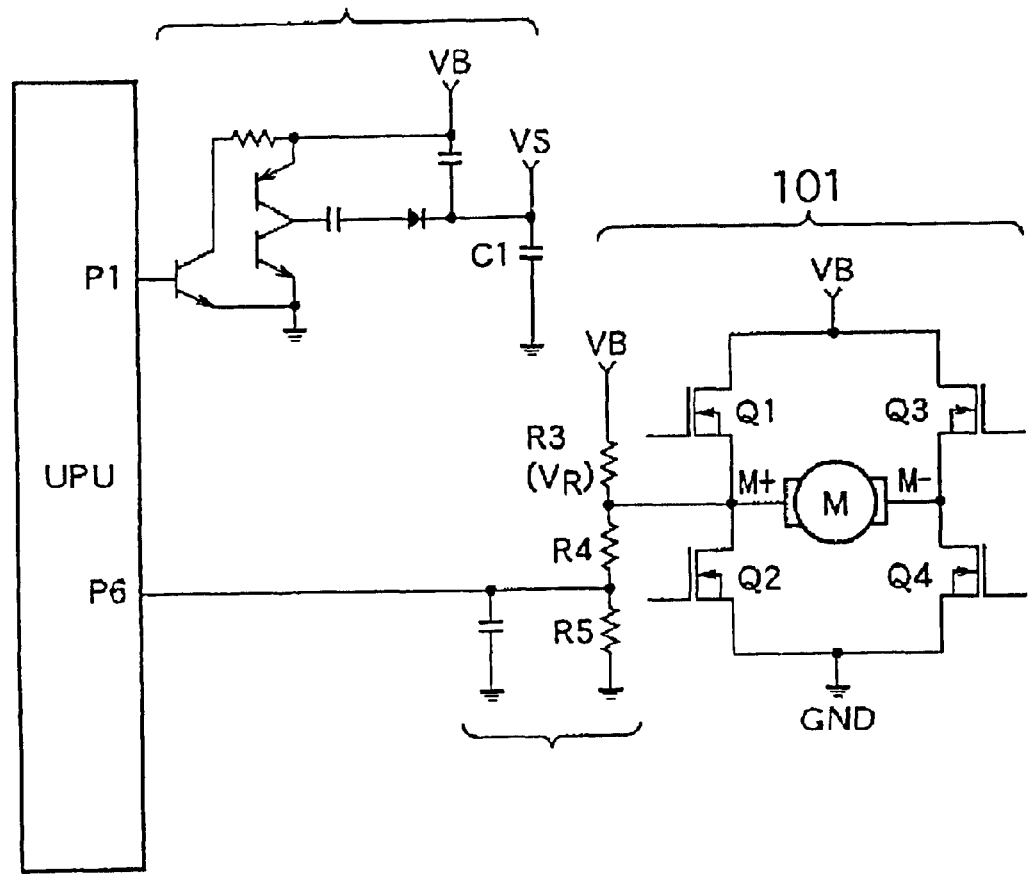
FIG. 8 is a circuit diagram according to a prior art.

The automatic transmission to which the invention is applied also comprises an electric actuator 3. This electric actuator 3 comprises, for example, a direct current motor and is connected to a controlling circuit 9 through an actuator driving circuit 7 of controlling unit 5. The actuator driving circuit 7 forms an H type of bridge circuit by four switching elements comprising a power MOSFET, similar to FIG. 8 described above, and can control the direction of rotation and the speed by controlling a duty ratio. The actuator driving circuit 7 is connected to an electric current detecting circuit 11, which operates as electric current detecting unit, so that a driving current of the actuator 3 would be detected and inputted to the controlling circuit 9.

The above-mentioned actuator 3 is connected to a manual shaft of the automatic transmission through a reduction gear mechanism, and the manual shaft is arranged to interlock with a range switching valve. The range switching valve interlocks with the manual shaft to enable the automatic transmission to be shifted, when the actuator 3 rotates the manual shaft through the reduction gear mechanism.

A potentiometer 13, which operates as rotation position detecting unit, interlocks with the above-mentioned actuator 3. The potentiometer 13 is connected to the above-mentioned controlling circuit 9 through a potentiometer I/F circuit 15, so that the detection signal would be inputted to the controlling circuit 9. The potentiometer 13 is mounted at an end portion of the above-mentioned manual shaft on the outer surface or such of the above-mentioned reduction gear mechanism, and outputs a voltage value in accordance with a rotation angle of the manual shaft, so that the rotation angle of the manual shaft can be detected on the basis of the voltage value.

An operation switch portion 17 is connected to the above-mentioned controlling circuit 9 as shift operating unit, so that an instruction signal would be inputted to the controlling circuit 9 when the operation switch portion 17 instructs a shifting position. The instruction signal of the operation switch portion 17 is such as a parking range P, a reverse range R, a neutral range N, and driving ranges D4, D3, D2, and D1.

Thus, when the operation switch portion 17 instructs a shifting position, the instruction signal would be inputted to the controlling circuit 9, which drives and controls the actuator 3 to rotate and drive the manual shaft to the instructed shifting position. When the rotation position of the manual shaft, which is detected by the potentiometer 13, accords with the shifting position instructed by the above-mentioned operation switch portion 17 at that time, driving and controlling of the actuator 3 are stopped and the manual shaft is rotated to the instructed shifting position, so that the shift is achieved.

On the other hand, the above-mentioned controlling circuit 9 forms self-diagnosis unit in this embodiment. That is, the controlling circuit 9 drives the above-mentioned actuator 3 until the actuator 3 passes over the above-mentioned instructed shifting position for a predetermined amount on the basis of the first instructed signal from the above-mentioned operation switch portion 17 at the starting time of driving an automobile, and drives the actuator 3 in reverse to the above-mentioned instructed shifting position. The controlling circuit 9 also drives the above-mentioned actuator 3 by varying high or low the duty ratio in driving and controlling the above-mentioned actuator 3, and thereby, self-diagnoses a trouble on the basis of whether or not an output signal of the above-mentioned potentiometer 13 corresponds to each drive described above. Namely, in this self-diagnosis, no circuit is, added for the diagnosis and the signal generated in the actual shift driving is used for the diagnosis.

Figure 2:
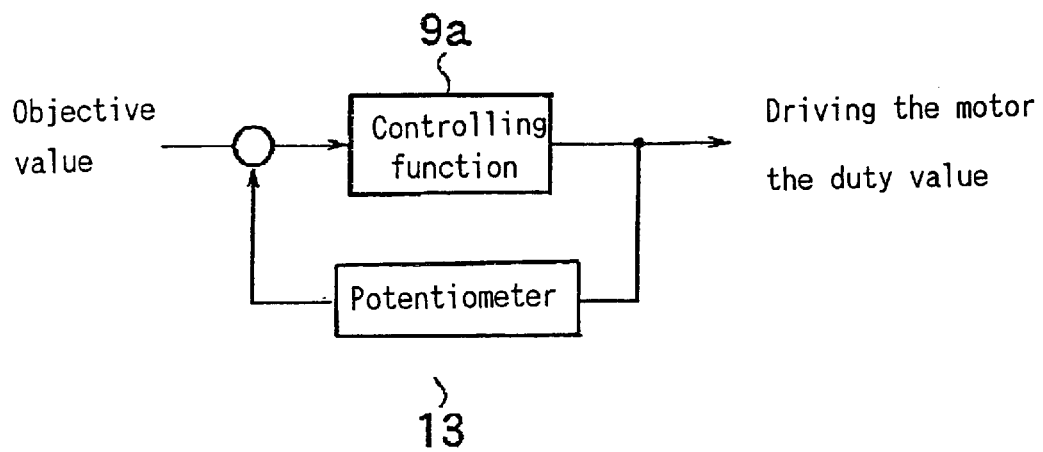
FIG. 2 is a block diagram showing actuator control according to an embodiment.

FIG. 2 is a block diagram showing control of the actuator 3 by the above-mentioned controlling circuit 9. The control function 9a shown in FIG. 2 is provided in the above-mentioned controlling circuit 9. According to the instruction by the above-mentioned operation switch portion 17, and objective value, that is, a voltage value indicating the shifting gear position is inputted to the controlling function 9a and a detection value of the potentiometer 13, that is, a voltage value indicating the current shifting gear position is also inputted to the controlling function 9a. Then, the controlling function 9a calculates the driving duty ratio of the actuator 3 to output the driving signal to the above-mentioned actuator driving circuit 7.

Figure 3:
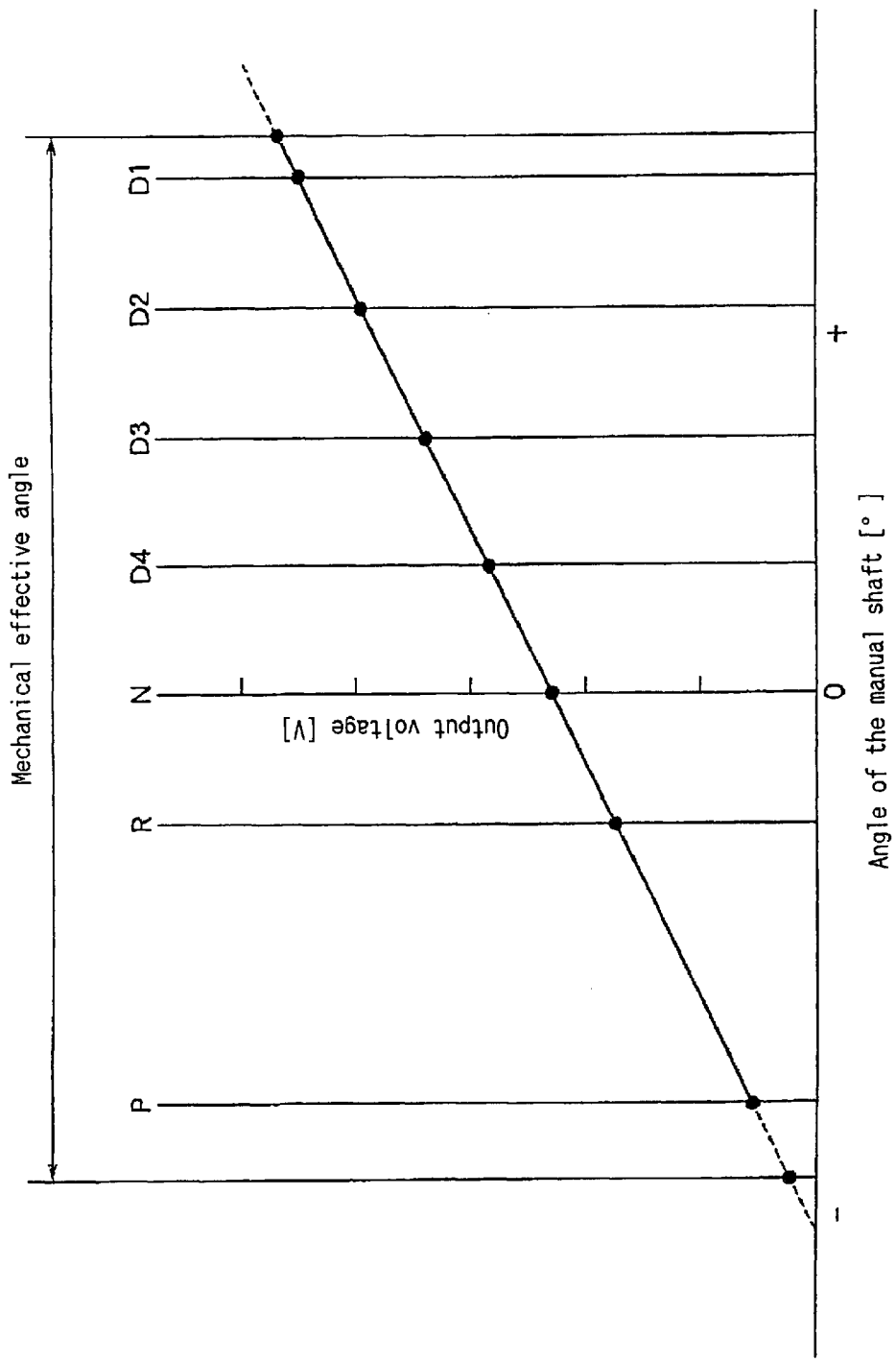
FIG. 3 is a graph showing an output characteristic of a potentiometer according to an embodiment.

The detection value of the above-mentioned potentiometer 13 is shown FIG. 3, for example. The lateral axis shows the rotation angle of the manual shaft and the potentiometer 13, while the vertical axis shows the output voltage value of the potentiometer 13. As shown in FIG. 3, the potentiometer 13 has an output characteristic almost proportional to the rotation angle of the manual shaft, and outputs the voltage value corresponding to the shifting positions P, R, N, D4, D3, D2 and D1.

Figure 4:
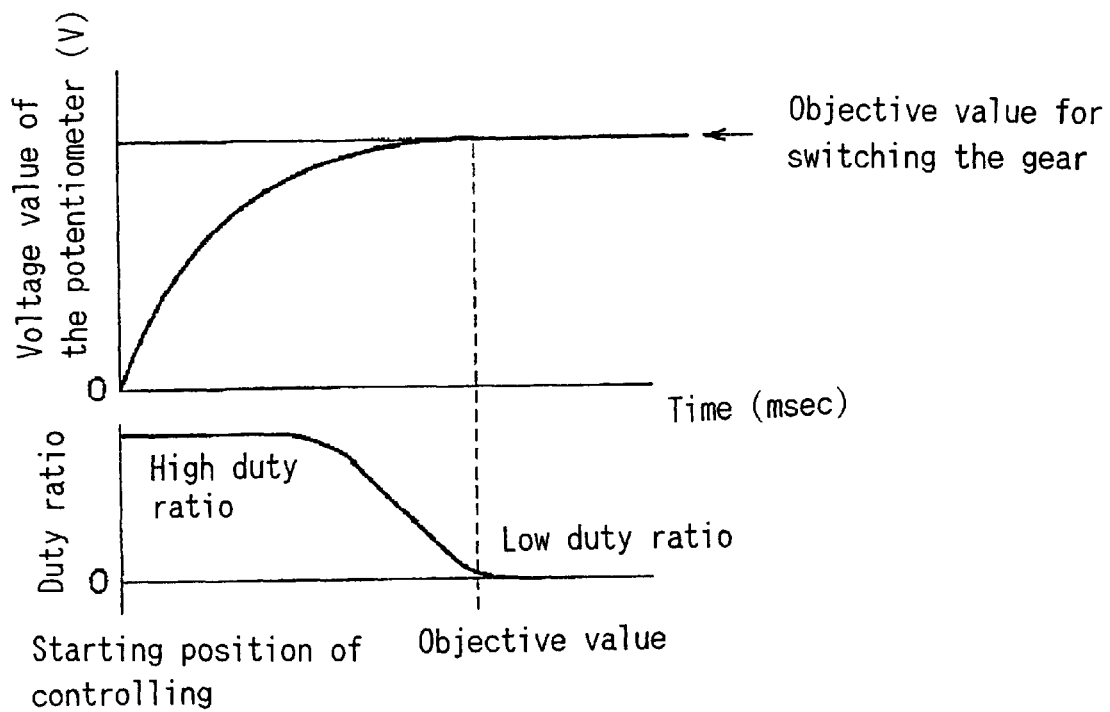
FIG. 4 is a graph showing normal control according to an embodiment.

Such arrangement of the controlling circuit 9 as described above and the detection by the above-mentioned potentiometer 13 enables the control shown in FIG. 4, for example. FIG. 4 shows normal shift controlling. The upper part of the drawing shows the detection voltage value of the potentiometer 13, while the lower part shows the driving duty ratio. It is required to rotate the manual shaft to a correct position in a short time in order to switch-control the gear. Therefore, the switch control is carried out as shown at the upper part in FIG. 4. The actuator 3 is operated at a high speed when the difference between the objective value and the current value is large, is operated at a lower speed when the current value is near the objective value, and is stopped accurately when the current value is at the objective value. Such control is carried out by the duty ratio control shown at the lower part in FIG. 4. The high duty ratio control is employed when the difference between the objective value and the current value is large, and the low duty ratio control is employed when the current value is near the objective value. This control is carried out in both directions from the shifting position P to D1 and from D1 to P, so that the actuator 3 is controlled normally and in reverse.

In the embodiment of the invention, it is arranged that whether such shift control as described above is correctly carried out or not is self-diagnosed in accordance with the first instruction signal from the above-mentioned operation switch portion 17 in a starting time of driving an automobile. The mechanism of this self-diagnosis is shown in FIG. 5.

Figure 5:
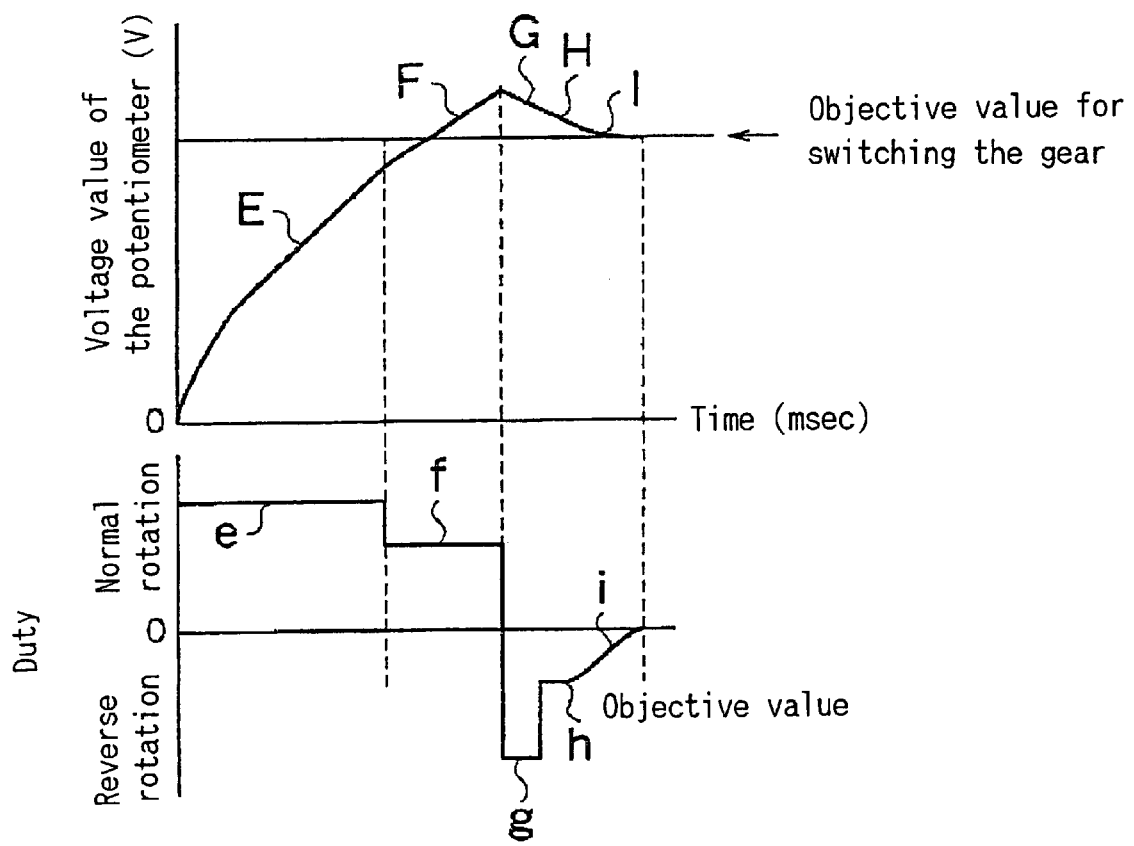
FIG. 5 is a graph showing self-diagnosis control according to an embodiment.

FIG. 5 shows shift control and self-diagnosis control carried out in accordance with the first instruction signal. In FIG. 5, the upper part shows the detection voltage value of the potentiometer 13, while the lower part shows the driving duty ratio. That is, it is arranged that the self-diagnosis of a trouble carried out by the driving duty ratio shown at the lower part in the drawing, on the basis of whether the detection voltage value shown at the upper part, the value which is detected by the potentiometer 13, corresponds to the instruction signal or not.

In this embodiment, the above-mentioned actuator 3 is driven until it passes over the above-mentioned instructed shifting position for a predetermined amount on the basis of the first instructed signal from the above-mentioned operation switch portion 17 at the starting time of driving an automobile, and is driven in reverse so as to be in the above-mentioned instructed shifting position, as described above. The above-mentioned actuator 3 is also driven by varying high or low the duty ratio in driving and controlling the above-mentioned actuator 3, and thereby, a trouble is self-diagnosed on the basis of whether or not an output signal of the above-mentioned potentiometer 13 corresponds to the drive described above.

Therefore, the actuator 3 is first driven at a high duty ratio e in a full power on the normal rotation side until it reaches an objective value in accordance with the first instruction signal, and then, the duty ratio is changed so that the actuator 3 would be driven at a low duty ratio f. At that time, the actuator is driven until the instructed shifting position (the objective value for switching the gear) is passed over. The actuator 3 is also driven in reverse and at the high duty ratio g again, and then, the duty ratio is changed into the low duty ratio h on the reverse side and is further changed i in order so as to be the objective value.

In the case that the change in the detection voltage value of the potentiometer 13 indicates the change from the normal rotation at a high speed E through the normal rotation at a lowered speed with the condition of passing over the shifting position for a predetermined amount F, the reverse rotation at a high speed G, the reverse rotation at a lowered speed H and the condition of gradually lowering the speed I to the condition of being at the instructed shifting position, the controlling circuit 9 is diagnosed to accurately operates the actuator driving circuit 7 so that the normal shift control shown in FIG. 4 would be carried out thereafter.

Such operation as shown in FIG. 5 is also carried out in the case that an operator operates a shifting lever to perform a mechanical shifting operation. That is, when an operator changes a shifting position by means of the shifting lever, the actuator 3 passes over the shifting position for a predetermined amount due to inertia, and then, returns a little to the instructed shifting position. Thus, there is no strange feeling for the self-diagnosis shown in FIG. 5. The amount of displacement in the operation over the above-mentioned predetermined amount is set at a maximum at around 20% of the amount from the position before the operation to the position after the operation, which corresponds to around 2 degrees of excess in angle.

The first instruction signal is such as from the range P to R, the range P to N, or the range P to D4–D1 in diagnosis shown in FIG. 5. When it is judged that the actuator driving circuit 7 is out of order in the above self-diagnosis, the controlling circuit 9 controls the actuator 3 so that the shifting position would be on the safety side regardless of the shifting position instructed by the operation switch portion 17. This fail-safe relation is shown at the table in FIG. 6. FIG. 6 shows the respective cases that a trouble in controlling from P to D is detected, that a trouble in controlling from D to P is detected, and that a trouble exists in controlling in the above both directions, for either one of the first instruction signals from P to R, from P to N, or from P to D4–D1.

When it is judged in the self-diagnosis in accordance with the first instruction signal from P to R that there is a trouble in controlling from P to D, that is, when the potentiometer voltage is not E and F for the drive at the duty ratio e and f, only the shift to P would be accepted in all kind of operation thereafter. Similarly, when there is a trouble in controlling from D to P, that is, when the potentiometer voltage is not G and H for the drive at the duty ratio g and h, only the shift to N would be accepted. When there is a trouble in controlling in the both directions, the current situation would be maintained or the shift input according to the first instruction signal would be ignored.

For the first instruction signal from P to N, controlling at N is stopped or the shift input according to the first instruction signal is ignored, when there is a trouble in controlling from D to P. When there is a trouble in controlling from P to D and in the both directions, the self-diagnosis would be same as that of the first instruction signal from P to R.

As for the direction from P to D4–D1, the self-diagnosis would be same as that of the first instruction signal from P to N when there is a trouble from P to D, since the self-diagnosis would be carried out from P to N as described below. When there is a trouble in controlling from D to P and in the both directions, the self-diagnosis would also be same as that of the first instruction signal from P to N.

In accordance with such control, the correct control can be achieved so that the automatic transmission would be on the safety side even when the actuator driving circuit 7 is diagnosed to be out of order.

The electric current detecting circuit 11 detects the driving current of the actuator driving circuit 7, which is inputted to the controlling circuit 9. Therefore, when any switching element of the actuator driving circuit 7 becomes out of order, for example, which causes a constantly electrified condition, the electric current is detected even without an instruction signal, so that a trouble can be detected.

Figure 7:
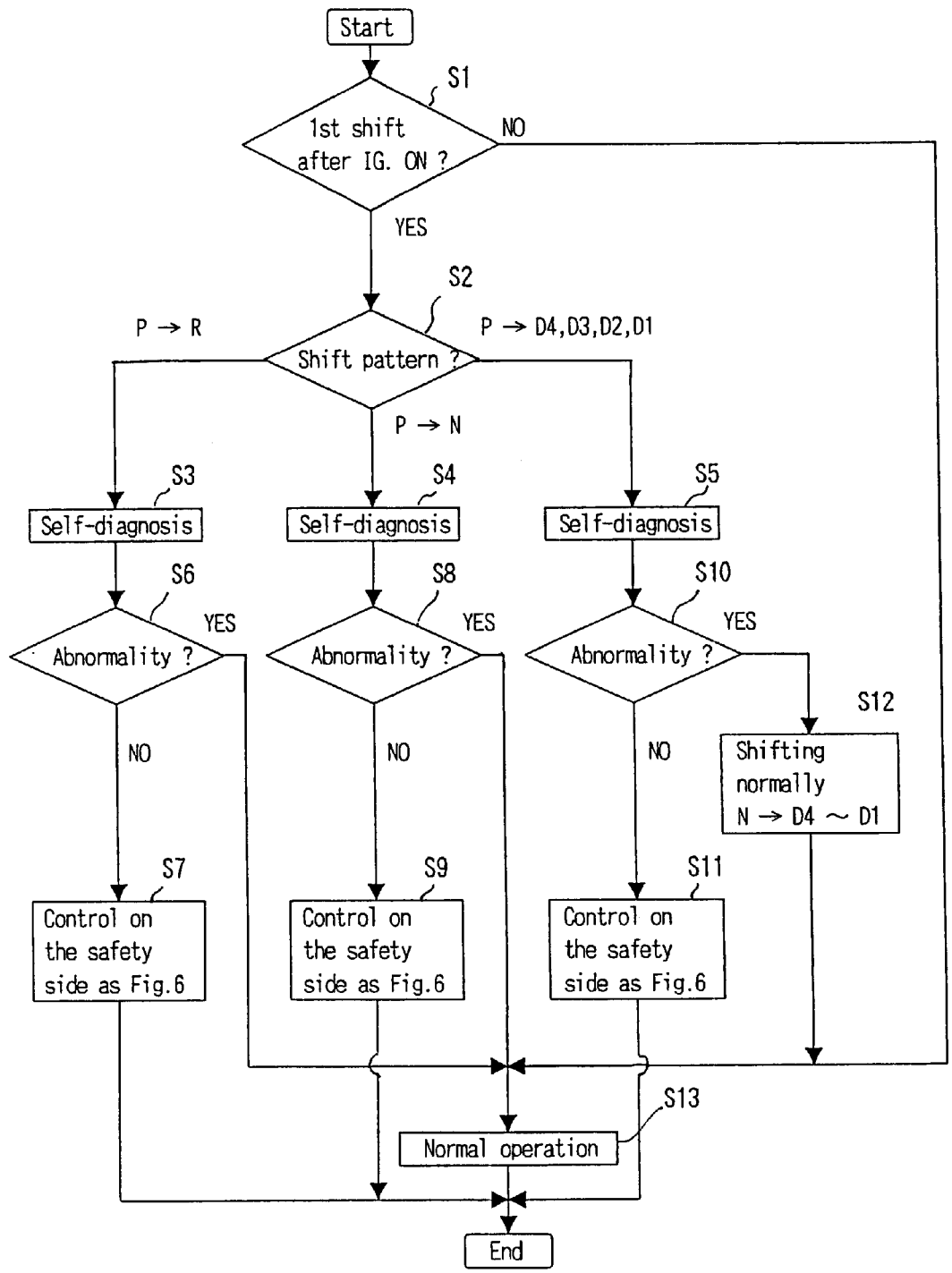
FIG. 7 is a flowchart according to an embodiment.

Next, a whole operation will be described with reference to a flowchart shown in FIG. 7. In Step S1, it is judged "whether or not it is the first shift after IGN ON". That is, the process goes to Step S2 when a signal of the ignition switch is inputted to the controlling circuit 9 and the operation switch portion 17 inputs an instruction signal to the controlling circuit 9; otherwise, the process goes to Step S13.

In Step S2, a shifting pattern in the accordance with the first instruction signal of the operation switch portion 17 is judged in the judgment of "How about the shift pattern?" When the shift is from P to R in this judgment, the process goes to Step S3; when from P to N, the process goes to Step S4; and when from P to D4, D3, D2, and D1, the process goes to Step S5.

In Step S3, a self-diagnosis shown in FIG. 5 as described above is carried out in accordance with a process of "performing a self-diagnosis in the shift from P to R". In Step S4, a similar self-diagnosis is carried out in accordance with a process of "performing a self-diagnosis in the shift from P to N". In Step S5, a similar self-diagnosis is carried out in accordance with a process of "performing a self-diagnosis in the shift form P to N". In Step S5, the diagnosis of a trouble is carried out between the parking range P and the neutral range N so that the pattern of the diagnosis can be made same as that of the case that the first instructing signal by the operation switch portion 17 is in the neutral range N, and thereby, the control can be simplified.

The processes go from Step S3 to S6, from Step S4 to S8, and from Step S5 to S10.

In Steps S6, S8 and S10, it is judged "whether there are any abnormality or not", and the processes go to Steps 7, 9 and 11, respectively, when it is judged that there is an abnormality.

In Step S7 mentioned above, such control on the safety side that only a shift to P can be accepted when a trouble in controlling from P to D is detected, for example, is carried out as described with reference to the table shown in FIG. 6, since the control for the self-diagnosis is carried out from so P to R.

In Step S9 mentioned above, such control on the safety side that only a shift to P can be accepted when a trouble in controlling from P to D is detected, for example, is carried out as described with reference to the table shown in FIG. 6, similarly, since the control for the self-diagnosis is carried out from P to N.

In Step S11 mentioned above, such control on the safety side that only a shift to P can be accepted when a trouble in controlling from P to D is detected, for example, is carried out as described with reference to the table shown in FIG. 6, similarly, since the control for the self-diagnosis is carried out from P to N although the first instruction signal is from P to D4–D1.

The processes end after the control in steps S7, S9, and S11 so that the control would be maintained at that time.

The processes go to Step S13 mentioned above when it is judged that there is no abnormality in Steps S6 and S8 mentioned above. And then, a process of "normal operation" is carried out to perform the normal shift control shown in FIG. 4 mentioned above.

The process goes to Step 12 when it is judged in the above-mentioned step S10 that there is no abnormality, a process of "shifting normally from N to D4–D1" is carried out to perform the normal shifting operation from N to D4–D1, and then, the process goes to Step S13. Therefore, the normal shifting operation can be naturally performed with the diagnosis in Step S5 mentioned above.

Such control enables the self-diagnosis whether the actuator 3 can normally operate or not, that is, whether the four switching elements forming the actuator driving circuit correctly operate for a change in the normal-reverse duty ratio or not, and an automatic transmission can be shifted to the safety side in accordance with the self-diagnosis, so that the correct self-diagnosis can improve the safety significantly.

Further, there is no need to provide a special circuit, which means a simple circuit structure capable of manufacturing at a low cost. Moreover, an accurate self-diagnosis can be achieved since no pseudo-signal is used in the self-diagnosis.

Although the self-diagnosis in the case of normal-reverse rotation of the actuator and that of the duty ratio control are carried out together in the above embodiment, it may be possible to arrange that only one of the normal-reverse rotation and the duty ratio control can be achieved.

What is claimed is:

1. A self-diagnosis system in an automatic transmission including:
   an electric actuator for switching a shifting position by rotating a manual shaft;
   a shift operating unit for outputting an instruction signal for instructing said shifting position;
   a rotation position detecting unit for detecting a rotation angle of the said manual shaft on the basis of an output signal corresponding to the said rotation angle; and
   a controlling unit for driving and controlling said actuator until a rotation position, which is detected by the above-mentioned rotation position detecting unit in response to the receipt of the instruction signal from the above-mentioned shift operating unit, accords with the instructed shifting position;
   wherein the self-diagnosis system comprises:
      a self-diagnosis unit for diagnosing a trouble by driving said actuator to a position past said instructed shifting position for a predetermined amount on the basis of a first instruction signal by said shift operating unit at a starting time of driving an automobile and then driving the above-mentioned actuator in reverse to said instructed shifting position, and then judging whether or not an output signal of said rotation position detecting unit corresponds to such driving.

2. A self-diagnosis system in an automatic transmission including:
   an electric actuator for switching a switching position by rotating a manual shaft;
   a shift operating unit for outputting an instruction signal for instructing said shifting position;
   a rotation position detecting unit for detecting a rotation angle of said manual shaft on the basis of an output signal corresponding to the said rotation angle; and
   a controlling unit for driving and controlling the above-mentioned actuator until a rotation position, which is detected by said rotation position detecting unit in response to the receipt of the instruction signal from said shift operating unit, accords with the instructed shifting position;
   wherein the self-diagnosis system comprises:
      a self-diagnosis unit for diagnosing a trouble by driving said actuator to said instructed shifting position on the basis of a first instruction signal by said shift operating unit at a starting time of driving an automobile by varying high or low the duty ratio in driving and controlling said actuator, and then judging whether or not an output signal of said rotation position detecting unit corresponds to such driving.

3. The self-diagnosis system in an automatic transmission according to claim 2, wherein said self-diagnosis is carried out by issuing an instruction signal to change the duty ratio of the controlling unit of said actuator between high and low at the starting time of driving the automobile, and the drive of said actuator is controlled to the specified shifting position according to the instruction signal.

4. The self-diagnosis system in an automatic transmission according to claim 2, wherein said self-diagnosis is carried out by issuing an instruction signal to change the duty ratio of the controlling unit of said actuator between high and low at the starting time of driving the automobile, and the drive of said actuator is controlled to the specified shifting position according to the instruction signal.

5. A self-diagnosis system in an automatic transmission including:
   an electric actuator for switching a switching position by rotating a manual shaft;
   a shift operating unit for outputting an instruction signal for instructing said shifting position;
   a rotation position detecting unit for detecting a rotation angle of said manual shaft on the basis of an output signal corresponding to the said rotation angle; and
   a controlling unit for driving and controlling the above-mentioned actuator until a rotation position, which is detected by said rotation position detecting unit in response to the receipt of the instruction signal from said shift operating unit, accords with the instructed shifting position,
   wherein the self-diagnosis system comprises:
      a self-diagnosis unit for diagnosing a trouble after driving said actuator to the position over said instructed shifting position for a predetermined amount on the basis of the first instruction signal by said shift operating unit at a starting time of driving an automobile and after driving the above-mentioned actuator in reverse to said instructed shifting position, as well as driving said actuator by varying high or low the duty ratio in driving and controlling the above-mentioned actuator, in accordance with the judgment whether or not an output signal of said rotation position detecting unit corresponds to driving mentioned above.

6. The self-diagnosis system in an automatic transmission according to claims 1, 2, or 5, wherein the self-diagnosis is carried out between a parking range and a neutral range when the first instruction signal by said shift operating unit is a shifting instruction from a parking range to a driving range, and wherein said actuator is driven to said instructed driving range in accordance with a diagnosis that there is no trouble.

7. The self-diagnosis system in an automatic transmission according to claim 6, wherein said controlling unit controls said actuator so that only a shift to a safe shifting position is possible regardless of said instructed shifting position, when said self-diagnosis unit judges that there is a trouble.

8. The self-diagnosis system in an automatic transmission according to one of claims 1, 2, or 5, wherein said controlling unit controls said actuator so that only a shift to a safe shifting position is possible regardless of said instructed shifting position, when said self-diagnosis unit judges that there is a trouble.

9. An automatic transmission, comprising:

an electric actuator for switching a shifting position by rotating a manual shaft;

a shift operating unit for outputting an instruction signal for instructing said shifting position;

a rotation position detecting unit for detecting a rotation angle of said manual shaft on the basis of an output signal corresponding to said rotation angle;

a controlling unit for driving and controlling the above-mentioned actuator until a rotation position detected by said rotation position detecting unit accords with the instructed shifting position; and a self-diagnosis system for diagnosing a problem with the actuator by driving said actuator past said instructed shifting position upon receiving a first instruction signal from said shift operating unit, driving the actuator in reverse to said instructed shifting position, and varying a duty ratio of the controlling unit between high and low when driving the actuator to the specified shifting position, said self-diagnosis system including a means for judging whether or not an output signal of said rotation position detecting unit corresponds to such driving.

* * * * *